United States Patent [19]
Sommese et al.

[11] Patent Number: 5,446,076
[45] Date of Patent: Aug. 29, 1995

[54] COMPOSITION AND METHOD FOR ENHANCEMENT OF SETTLING STABILITY IN OIL CONTINUOUS LATEX POLYMERS

[75] Inventors: Anthony G. Sommese; R. Nagarajan, both of Naperville, Ill.

[73] Assignee: Nalco Chemical Company, Naperville, Ill.

[21] Appl. No.: 247,733

[22] Filed: May 23, 1994

Related U.S. Application Data

[63] Continuation of Ser. No. 13,894, Feb. 5, 1993, abandoned.

[51] Int. Cl.6 .................................................. C08K 9/04
[52] U.S. Cl. ................................. 523/200; 523/204; 523/207; 523/210; 524/445; 524/446; 524/447
[58] Field of Search ............... 523/200, 204, 207, 210; 524/445, 446, 447

[56] References Cited

U.S. PATENT DOCUMENTS

| | | | |
|---|---|---|---|
| 2,921,042 | 1/1960 | Caldwell | 260/30.4 |
| 4,474,706 | 10/1984 | Clay et al. | 260/440 C |
| 5,028,351 | 7/1991 | Kato et al. | 252/315.2 |

Primary Examiner—Paul R. Michl
Assistant Examiner—John J. Guarriello
Attorney, Agent, or Firm—Robert A. Miller; James J. Drake

[57] ABSTRACT

A method of stabilizing polymeric lattices comprising the addition of an organophilic clay which, when properly activated and dispersed, sets up a network that will suspend the polymer particles and retard the settling process is disclosed. The network is easily destroyed by the application of shear, but then reforms when shear is removed.

9 Claims, 2 Drawing Sheets ers 08/13,894, filed Feb. 5, 1993, abandoned.

COMPOSITION AND METHOD FOR ENHANCEMENT OF SETTLING STABILITY IN OIL CONTINUOUS LATEX POLYMERS

This application is a continuation of application number 08/13,894, filed Feb. 5, 1993, abandoned.

BACKGROUND OF INVENTION

1. Field of Invention

The invention relates to a method of inhibiting particle settling in oil-continuous latex polymers, and, more particularly, to a method of stabilizing oil continuous latex polymers by creating a reformable network.

2. Description of the Prior Art

Amine-modified bentonite clays are commonly used as particle stabilizers and rheological modifiers in the cosmetic and paint industries.

A large number of latex polymers are synthesized by an inverse emulsion process. The inverse emulsion process creates a polymer, as discrete particles, suspended in an oil-continuous phase. The particles are prone to settle on aging. This settling is manifested in an oil split at the top of the container and a thick sediment at the bottom.

Bentonite clay has the desirable property of being thixotropic and shear thinning, i.e., it forms a network which is easily destroyed by the application of shear, but then reforms when shear is removed. The problem with "normal" bentonite clay is its incompatibility with hydrocarbon solvents. Amine-modified bentonite clay, or so-called "organo" clays, is compatible with the oil-continuous phase of inverse polymer latices.

Many other materials also exhibit thixotropic, and shear-thinning, properties. Like the organophilic clays, these materials are used primarily in the cosmetic and paint industries. The vast majority of these materials, like starches, poly-acrylates, natural gums and resins, are compatible only in aqueous systems, effectively eliminating them as candidates for use in conjunction with oil continuous latex polymers.

In comparison, there are relatively few oil compatible additives. The literature does not disclose the use of shear-thinning additives as stabilizers for oil-continuous inverse polymer latices.

Desirably, an additive would exist which would overcome the disadvantages of the prior art by being universally compatible, having better processing conditions and achieving a lower overall product viscosity.

SUMMARY OF THE INVENTION

The invention is a method of stabilizing oil continuous latex polymers comprising the addition of an amine-modified organophilic clay to the oil-continuous latex polymer which, when properly activated and dispersed, sets up a network that will suspend the polymer particles and retard the settling process. This network is easily destroyed by the application of shear, but then reforms when shear is removed.

DESCRIPTION OF THE PREFERRED EMBODIMENT

The method of the invention is described in detail herein. 0.5–3.0% of an amine-modified bentonite clay, such as Claytone AF manufactured by Southern Clay Products, Inc. of Gonzales Tex., based on the amount of oil in the latex polymer, is added. A typical example is bentonite clay, preferably modified with dimethyl-ditallow ammonium chloride. The clay may, however, comprise any amine-modified organophilic clay, including bentonite, montmorillonite, hectorite and mixtures thereof. Further, the amine modifiers preferably is a quaternary alkyl or aromatic amine. The clay may also be modified with other organic groups, e.g., benzyl, or other quaternary compounds e.g. sulfonium or phosphonium salts. The clay is added as a solid powder or as a dispersion in oil and dispersed using simple agitation and/or recirculation through a centrifugal pump until a constant product viscosity is reached. In some instances activators may be needed to help disperse the clay. Preferred activators include propylene carbonate, methanol, acetone and water. The constant product viscosity indicates full dispersion and activation of the clay. Enhancement of the settling stability is evaluated by a settling test.

Settling Stability Tests

Figure 1:
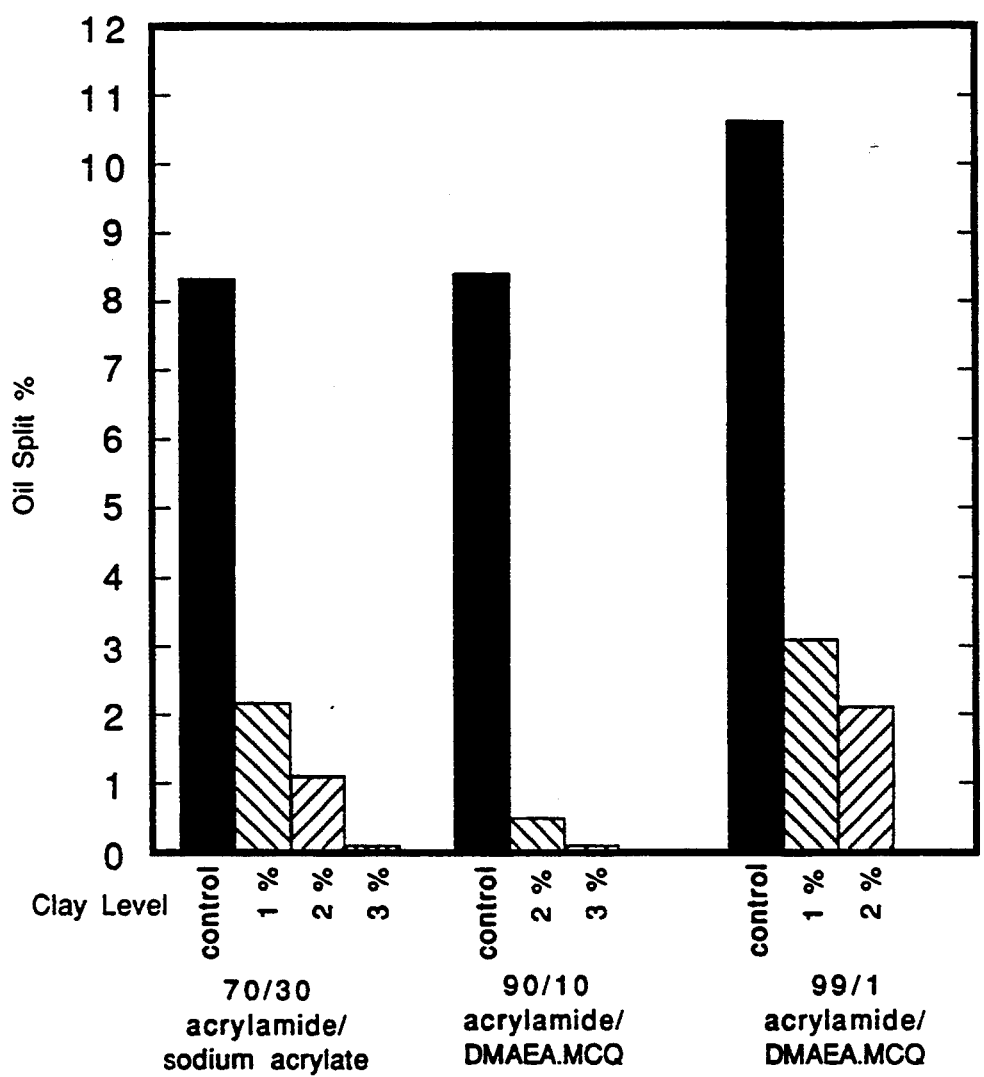
FIG. 1 is a graph showing oil splits for various latex polymers utilizing the claimed organophilic clay as a settling stabilizer.
Figure 2:
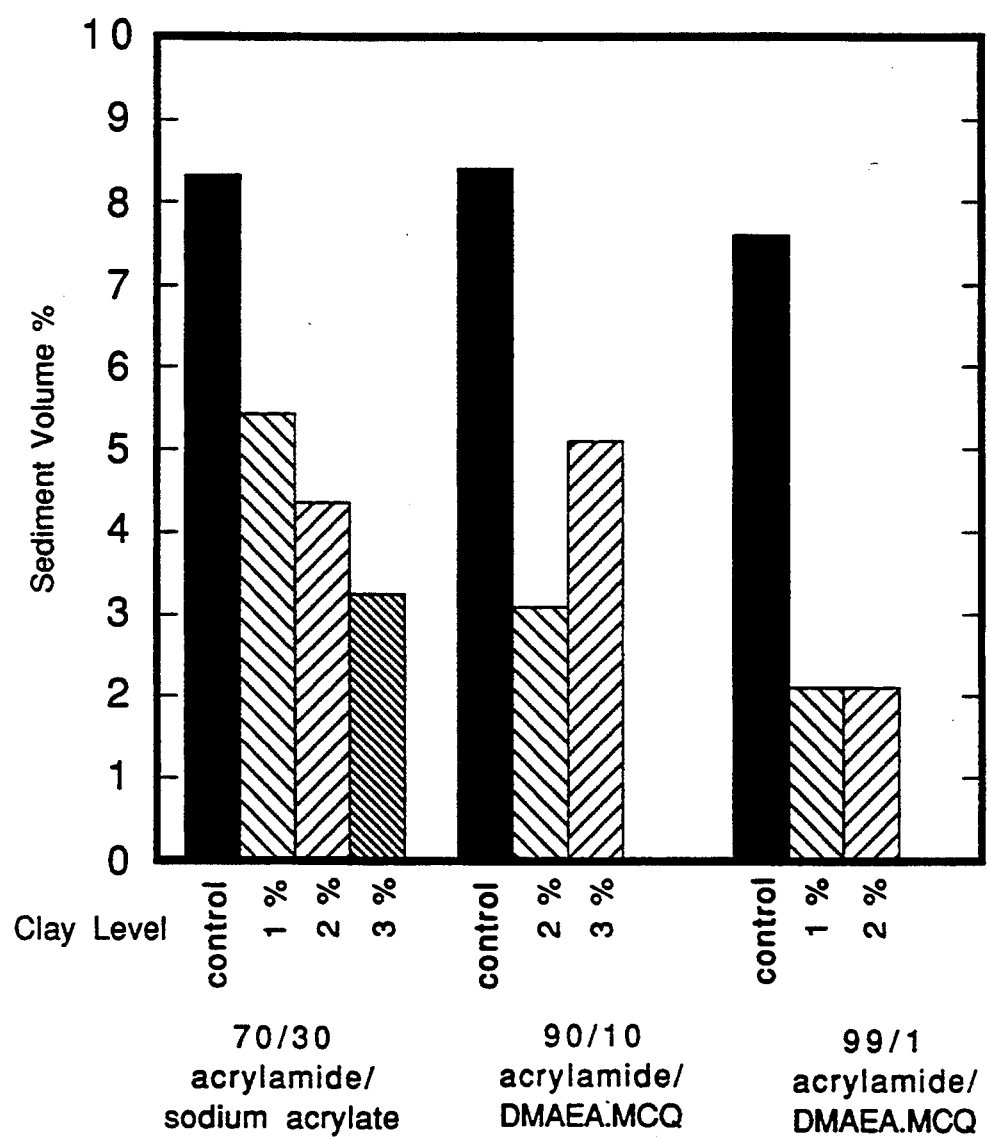
FIG. 2 is a graph showing sediment volume percentages for various latex polymers utilizing the claimed settling stabilizer compound.

Settling stability is measured by a standard test similar to ASTM D 3716-83. In this test, 200 g of the latex is placed in an 8 ounce polyvinyl chloride bottle and allowed to stand at 40° C. for 28 days. The oil split is measured and reported as a percentage of the total height of the latex. Oil splits for various latex polymers utilizing 1, 2 or 3% of an amine-modified organophilic clay are shown in FIG. 1. The latex is allowed to flow from the inverted bottle for 5 minutes. At this time, the bottle is righted and physical measurements taken. The volume and weight of sediment are taken and reported as a percentage of the initial height and amount of latex. Sediment volume percentages resulting from the addition of 1, 2 or 3% of an amine-modified organophilic clay are shown in FIG. 2.

These tests are routinely conducted on four to eight bottles of the same latex, i.e., same lot number, and the settling values for the latex are reported as an average.

EXAMPLE 1

To a series of 70/30 acrylamide/sodium acrylate latices having 25% oil (Low Odor Paraffinic Solvent, Exxon) was added solid amine-modified bentonite clay (Claytone AF) at weights of 1, 2 and 3% respectively, based on the oil content. The clay was added to the top of the reactor and vigorously stirred. Dispersion and activation can be accelerated if the latex is recycled through a pump. The bulk viscosity change, which is a qualitative measure of the activation and dispersion of the clay, was monitored until a constant value was achieved. The viscosity changes for the various clay levels were: 1% clay, 34% increase, 2% clay, 45% increase, 3% clay, 50% increase. The settling stability of these latices was determined by a settling test and was compared to control samples of the same lot number which did not contain clay. The settling stability results are contained in FIGS. 1 and 2.

To a series of 90/10 acrylamide/dimethylaminoethyl acrylate (methylchloride quaternary salt) latices containing 26.2% oil (Low Odor Paraffinic Solvent, Exxon) was added solid amine-modified bentonite clay (Claytone AF) at weights of 2% and 3%, respectively, based on the oil content. The clay was added to the top of the reactor and vigorously stirred to disperse and activate the clay. The viscosity changes for the various clay levels were: 2% clay, 8% increase, 3% clay, 14% increase. The settling stability of these latices was determined by a settling test and was compared to control samples (same lot) not containing clay. The settling stability results are contained in FIG. 2.

To a series of 99/1 acrylamide/dimethylaminoethyl acrylate (methylchloride quaternary salt) latices containing 28.5% oil was added solid amine-modified bentonite clay (Claytone AF) at weights of 1 and 2%, respectively, based on the oil content. The clay was added to the top of the reactor and vigorously stirred to disperse and activate the clay. The viscosity changes for the various clay levels were: 1% clay, 34% increase, 2% clay, 53% increase. The settling stability of these latices was determined by a settling test and were compared to a control sample (same lot) not containing clay. The settling stability results are contained in FIG. 2.

In all above examples, settling stability was increased when the organophilic clay was added to the system. The clay did not have a detrimental effect on the polymer's physical properties and acts only to suspend the polymer particles.

Although the invention has been described in its preferred from with a certain degree of particularity, it will be understood that the present disclosure of the preferred embodiments has been made only by way of example. Under various changes may be resorted to without departing from the true spirit and scope of the invention as hereinafter claimed. It is intended that the patent shall cover, by suitable expression in the appended claims, where features of patentable novelty exist in the invention disclosed.

We claim:

1. A method of stabilizing a suspension of oil-containing latex polymer beads in an oil, the method comprising the steps of:
    adding from about 0.01% to 4.0% by weight of an amine-modified organophilic clay to the oil-containing latex polymer beads;
    mixing the amine-modified organophilic clay and the oil-containing latex polymer beads to create a homogenous mixture.

2. The method of claim 1 wherein the organophilic clay is selected from the group consisting essentially of bentonite, montmorillonite, hectorite and mixtures thereof.

3. The method of claim 1 wherein the amine-modified organophilic clay is modified with a quaternary amine containing at least one alkyl group.

4. The method of claim 1 wherein the amine-modified organophilic clay is modified with a quaternary amine containing at least one aromatic group.

5. The method of claim 1 wherein the organophilic clay is modified with a sulfonium salt.

6. The method of claim 1 wherein the organophilic clay is modified with a phosphonium salt.

7. The method of claim 1 further comprising the step of activating the homogenous mixture with an activator.

8. The method of claim 7 wherein the activator is selected from the group consisting of essentially of propylene carbonate, methanol, acetone and water.

9. The method of claim 3 wherein the quaternary amine is dimethyl-ditallow ammonium chloride.

* * * * *